United States Patent [19]

Garbo

[11] Patent Number: 5,025,631

[45] Date of Patent: Jun. 25, 1991

[54] COGENERATION SYSTEM WITH LOW $NO_x$ COMBUSTION OF FUEL GAS

[76] Inventor: Paul W. Garbo, 48 Lester Ave., Freeport, N.Y. 11520

[21] Appl. No.: 553,260

[22] Filed: Jul. 16, 1990

[51] Int. Cl.$^5$ ............................................. F01K 23/10
[52] U.S. Cl. ....................................... 60/655; 60/683
[58] Field of Search ................................... 60/655, 683

[56] References Cited

U.S. PATENT DOCUMENTS

| | | | |
|---|---|---|---|
| 4,479,355 | 10/1984 | Guide et al. | 60/683 |
| 4,492,085 | 1/1985 | Stahl et al. | 60/683 X |

*Primary Examiner*—Allen M. Ostrager
*Attorney, Agent, or Firm*—Paul W. Garbo

[57] ABSTRACT

Cogeneration of at least electricity and refrigeration with low $NO_x$ combustion of fuel gas supplied at high pressure involves expanding the gas, after preheating, in a turbo-expander which drives a centrifugal compressor for the refrigerant vapor of a refrigeration system. The expanded fuel gas admixed with a limited amount of air is fed to a porous fiber burner to effect flameless combustion on the outer surface of the burner and yield a flue gas with a very low content of $NO_x$ and other pollutants. Combustion heat is used to produce high-pressure steam which is fed to a steam turbine that drives an electric generator. The flue gas can be passed through an absorption system for the recovery of carbon dioxide, part of the steam being utilized in the absorption system. When desired, recovered carbon dioxide can be liquefied with refrigeration produced by the cogeneration system.

12 Claims, 2 Drawing Sheets

COGENERATION SYSTEM WITH LOW NO$_x$ COMBUSTION OF FUEL GAS

BACKGROUND OF THE INVENTION

This invention relates to the cogeneration of electricity and refrigeration by the low NO$_x$ combustion of natural gas or like fuel gas rich in methane and other gaseous hydrocarbons. More particularly, the combustion of fuel gas with low NO$_x$ emission makes it feasible to recover carbon dioxide (CO$_2$) as a product of cogeneration.

Cogeneration systems have received considerable attention in recent years. Many processes have been proposed for the cogeneration of electricity and saleable refrigeration or heating steam. Many cogeneration schemes are based on the use of gas turbines which have certain disadvantages. For example, U.S. Pat. No. 4,528,811 to Stahl shows several cogeneration systems involving the combustion of fuel gas and passage of the hot combustion products through a gas turbine. Stahl points out that gas turbines are normally operated with about 300% excess air over the stoichiometric requirement. Any large amount of excess air naturally decreases the thermal efficiency of the system. Moreover, in light of the rapidly growing concern about atmospheric pollution by combustion processes, a further disadvantage is being recognized in that the gaseous effluents of gas turbines contain high amounts of nitrogen oxides (NO$_x$), usually in excess of 100 parts per million (ppm), as well as carbon monoxide (CO) and unburned hydrocarbons.

Accordingly, a principal object of this invention is to avoid the use of gas turbines in congeneration systems by substituting therefor steam turbines.

A related principal object is to generate steam for the steam turbines by introducing fuel gas admixed with air into a porous fiber burner and effecting flameless combustion on the outer surface of the burner to minimize NO$_x$ formation.

A further object is to limit the amount of excess air used in the combustion of fuel gas to yield a flue gas of increased CO$_2$ content.

Another important object is to recover CO$_2$ from the flue gas and to utilize the cogenerated refrigeration to liquefy the CO$_2$.

These and other features and advantages of the invention will be evident from the description which follows.

SUMMARY OF THE INVENTION

In accordance with this invention, the cogeneration of electricity and refrigeration through low NO$_x$ combustion of fuel gas, principally natural gas supplied at high pressure of at least about 200 pounds per square inch absolute (psia), involves expanding the fuel gas with the performance of work which is utilized to compress the refrigerant vapor of a refrigeration system, effecting flameless combustion of the expanded fuel gas with a limited amount of excess air on the outer surface of a porous fiber burner to produce high-pressure steam, and expanding the steam with the performance of work, which is utilized to drive an electric generator. In view of the low NO$_x$ content of the resulting flue gas as well as the limited amount of excess air therein, the flue gas is a commercially feasible source for the recovery of substantially pure CO$_2$.

For such recovery, part of the steam produced by the flameless combustion of the fuel gas is utilized in the absorption separation of CO$_2$ from the flue gas and, when desired, refrigeration produced by the expansion of the fuel gas may be used to liquefy the separated CO$_2$. Accordingly, at the very least this invention can cogenerate electricity and refrigeration but can also yield CO$_2$ in gaseous or liquid form.

The performance of work by the expansion of the pressurized fuel gas is preferably carried out in a turbo-expander connected to a centrifugal compressor for the refrigerant vapor. The performance of work by the expansion of pressurized steam is preferably conducted in a steam turbine connected to an electric generator.

The fuel gas utilized in the low NO$_x$ combustion of this invention is usually natural gas that is rich in methane and may contain varying amounts of $C_2$ to $C_4$ hydrocarbons as well as traces of higher hydrocarbons. Syngas or refinery gas of similar composition is also a suitable fuel gas. It is advisable that the fuel gas have a low content of undesirable gases such as hydrogen sulfide or that it be pretreated to eliminate troublesome components. The fuel gas is usually supplied from a pipeline at a pressure generally in the range of about 200 to 600 psia but occasionally is at a higher pressure or at a somewhat lower pressure.

BRIEF DESCRIPTION OF THE DRAWINGS

For a fuller understanding of the invention, the further description will refer to the appended drawings of which.

DESCRIPTION OF PREFERRED EMBODIMENTS

Figure 1:
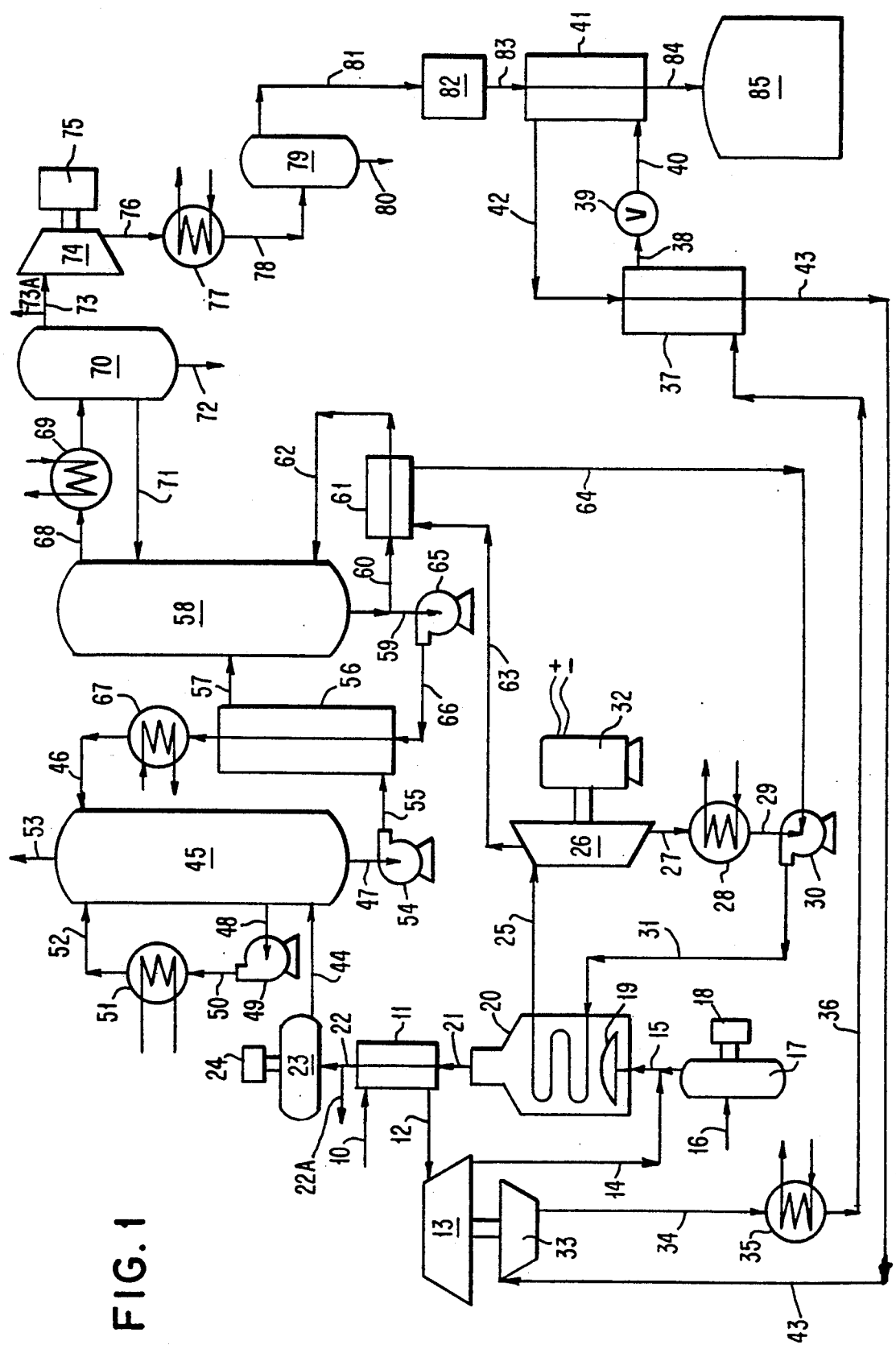
FIG. 1 is a flow diagram of the cogeneration system of the invention in a preferred integrated embodiment.

The description of FIG. 1 will include data of a specific example of a well integrated form of the invention.

Natural gas with a net heating value of 930 British Thermal units (BTU) per standard cubic foot is supplied from a pipeline at a pressure of 500 psia and a temperature of 60° F. at the rate of 382,000 standard cubic feet per hour (SCFH) via line 10 to heat exchanger 11. The gas leaves exchanger 11 through line 12 and at a temperature of 330° F. enters turbo-expander 13 wherein the pressure is reduced to 25 psia. The expanded gas at a temperature of 35° F. flows from expander 13 through line 14 into line 15 wherein it mixes with air that has entered inlet 16 of blower 17 driven by electric motor 18. All of the air fed to line 15 is limited to an amount that is only 15% in excess of the stoichiometric requirement of the natural gas flowing into line 15. The mixture of natural gas and air flows from line 15 into porous fiber burner 19 in steam boiler 20.

Burner 19 has a porous fiber layer on its convex side. The production of porous fiber burners is well known. Basic teachings of such burners are found in U.S. Pat. No. 3,275,497 and U.S. Pat. No. 3,383,159 which adds aluminum powder in the porous fiber layer to suppress the formation of CO in the flameless combustion of the natural gas. While burner 19 is simply represented as having a large convex-lens shape, other shapes, such as tubular, may be used. In fact, the shape of burner 19 will usually be selected depending on the size and configuration of boiler 20. Inasmuch as the porous fiber layer of burner 19 becomes a glowing surface during combustion that radiates infrared energy, burner 19 is disposed in boiler 20 so that the glowing surface faces the steam-generating tubes therein. Also, while a single burner 19 is shown in boiler 20 to simplify the diagram, it will be appreciated that generally a multiplicity of burners 19 will be used in any large boiler 20.

Hot flue gas, containing only 18 ppm $NO_x$, 30 ppm CO and 5 ppm unburned hydrocarbons, leaves boiler 20 at a temperature of 350° F. and passes through line 21 and heat exchanger 11 from which it exits at a temperature of 310° F. via line 22. Steam generated in boiler 20 passes at a pressure of 600 psia via line 25 into steam turbine 26. Fully expanded steam leaves turbine 26 through line 27 and passes through water-cooled condenser 28. The pressure at the exit port of steam turbine 26 is about 2.5 inches of mercury column. The condensate formed in condenser 28 drains via line 29 into pump 30 which returns it via line 31 to boiler 20.

The work performed by steam turbine 26 is utilized to drive electric generator 32 which is connected thereto. Generator 32 produces 24.5 megawatts (MW) of electricity. The work performed by turbo-expander 13 by the expansion of natural gas to a discharge pressure of 25 psia is utilized to drive associated centrifugal compressor 33 in which refrigerant vapor, such as DuPont Freon R-12, is compressed to a pressure of 135 psia and temperature of about 200° F. The hot compressed refrigerant vapor exiting compressor 33 through line 34 passes through water-cooled condenser 35 and at a temperature of 100° F. continues its flow as a liquid in line 36 to subcooler exchanger 37. The subcooled refrigerant leaves subcooler 37 at a temperature of 20° F. through line 38 and passes through pressure-reducing valve 39. The liquid refrigerant discharges from valve 39 at a pressure of 12 psia and temperature of −30° F. through line 40 into heat exchanger 41 wherein it is vaporized by heat abstracted from the other stream flowing through exchanger 41. Refrigerant vapor passes from exchanger 41 through line 42, subcooler 37 and line 43 to enter compressor 33 at a temperature of 80° F. and pressure of 10 psia. Thus, the refrigeration cycle from compressor 33 to refrigerant evaporator 41 has been completed. The sub-cooled refrigerant is vaporized in evaporator 41 at a temperature of −30° F. to deliver 435 tons of refrigeration. This temperature can be varied in a range of about 20° F. to −60° F. However, in the example which is being described the temperature of the refrigerant in evaporator 41 is −30° F.

Up to this point, the cogeneration of this invention has produced electricity at generator 32 and refrigeration at evaporator 41. However, in accordance with the more fully integrated embodiment of the invention shown in FIG. 1, the separation of $CO_2$ from the flue gas produced in boiler 20 is achieved. For this purpose, the flue gas in line 22 enters blower 23 driven by electric motor 24 and is pressurized enough to flow via line 44 into and up through absorption column 45 in scrubbing relation with counter-flowing amine solution. Regenerated amine solution enters column 45 via line 46 and $CO_2$-laden solution leaves column 45 through line 47. Heat of absorption is dissipated by circulating the amine solution of column 45 through line 48, pump 49, line 50, water-cooled exchanger 51 and line 52. The discard gas, predominantly nitrogen with about 10% by volume of water vapor, leaves column 45 through line 53.

Pump 54 passes the $CO_2$-enriched amine solution from line 47 through line 55, heat exchanger 56 and line 57 into stripping column 58. Stripping heat is supplied to column 58 by circulating amine solution through lines 59,60, reboiler 61 and line 62. Reboiler heat is obtained by drawing steam from an intermediate stage of steam turbine 26 through line 63 connected to reboiler 61. The steam entering reboiler 61 is at a pressure of 70 psia and temperature of 320° F. The condensate formed in reboiler 61 flows through line 64 to pump 30 which returns the total condensate of lines 29,64 to boiler 20 via line 31.

Stripped amine solution from line 59 is returned by pump 65 through line 66, heat exchanger 56, water-cooled exchanger 67 and line 46 to absorption column 45. Part of the heat in the stripped amine solution is transferred in exchanger 56 to the $CO_2$-laden amine solution flowing into stripping column 58.

$CO_2$ gas released from the amine solution rises in column 58 and together with water vapor passes via line 68 through water-cooled condenser 69 to discharge into separator 70. Water condensate returns from separator 70 via line 71 as reflux in column 58. Water is discarded from separator 70 through drain line 72 at the same rate at which water vapor enters column 45 with the flue gas from line 44.

$CO_2$ gas leaves separator 70 via line 73 at slightly above atmospheric pressure and a temperature of about 100° F. The gas is saturated with water vapor but otherwise is $CO_2$ containing a very small fractional percentage by volume of other gases such as nitrogen and oxygen. At this point, the $CO_2$ gas could be utilized to enhance the recovery of crude oil from an underground formation as taught in U.S. Pat. No. 3,442,332 to Keith or to provide an inert atmosphere as required in some chemical or metallurgical operations. When necessary, the $CO_2$ gas would be dehydrated before use. Branch line 73A is provided for the delivery of $CO_2$ gas.

Liquid $CO_2$ is a more valuable form of the product that is in great demand, e.g., by manufacturers of carbonated beverages and frozen foods. To liquefy, 85% of the $CO_2$ gas from line 73 is compressed by centrifugal compressor 74 driven by electric motor 75 to a pressure of 220 psia and flows via line 76 through water-cooled condenser 77 wherein the gas temperature is reduced to about 100° F. with the result that moisture in the gas is condensed. The cooled stream flows through line 78 into separator 79 wherein water condensate is knocked down and discharged via drain line 80. Line 73A serves to deliver 15% of the $CO_2$ gas from line 73 to a purchaser.

$CO_2$ gas saturated with moisture exits separator 79 via line 81 and passes through dryer 82 wherein residual moisture is removed from the compressed $CO_2$ gas. Dryer 82 may be filled with a molecular sieve that adsorbs moisture but any of various known dryers may be used to dehydrate the $CO_2$ gas. Dry $CO_2$ gas passes through line 83 and heat exchanger 41 wherein it is liquefied. Liquid $CO_2$ discharges via line 84 into storage tank 85 at a temperature of −20° F. and pressure of 215 psia. Liquid $CO_2$ is recovered at the rate of 35,400 pounds per hour or 425 tons per day.

Electric motors 18,24,75 and those (not shown) for pumps 30,49,54,65 consume a total of about 2.4 MW of electric power. Pumps to circulate cooling water to exchangers 28,35 51,67,69,77 and fans of a water-cooling tower are estimated to consume approximately 1.1 MW. Hence, of the 24.5 MW of power produced by generator 32, 21 MW are available for sale after satisfying the power requirements of the cogeneration system.

Recapping the example described in relation to the flowsheet of FIG. 1, the combustion of 382,000 SCFH of natural gas with only 15% in excess of the stoichiometric requirement of air with a porous fiber burner yields a flue gas containing a remarkably low content of pollutants, thus achieving an important advance in environmental protection. Reduction of the pressure of the natural gas prior to combustion is used to produce 435 tons of refrigeration while the combustion is used to produce high-pressure steam to drive an electric generator which delivers 24.5 MW of power. The flue gas resulting from the flameless combustion of the natural gas on the outer surface of the porous fiber burner is processed to recover $CO_2$ gas having a purity of about 99.9% by volume. With the refrigeration generated in the system, 85% of the $CO_2$ gas becomes valuable liquid $CO_2$, while 15% of the recovered $CO_2$ gas is the other product of cogeneration.

On the other hand, if only gaseous $CO_2$ is desired as a product of cogeneration, 360,000 SCFH of $CO_2$ will be delivered by line 73A and 435 tons of refrigeration will be available for sale at evaporator 41. In such case, besides the delivery of $CO_2$ gas and refrigeration, the cogeneration system of FIG. 1 will also have available for sale an additional 1.5 MW of electricity that was required to operate motor 75 and other auxiliary motors. In short, the cogeneration system of FIG. 1 can simultaneously deliver three products: refrigeration, electric power and substantially pure $CO_2$ gas, while discharging into the atmosphere a vent gas with an unusually low content of pollutants: $NO_x$, CO and unburned hydrocarbons.

Figure 2:
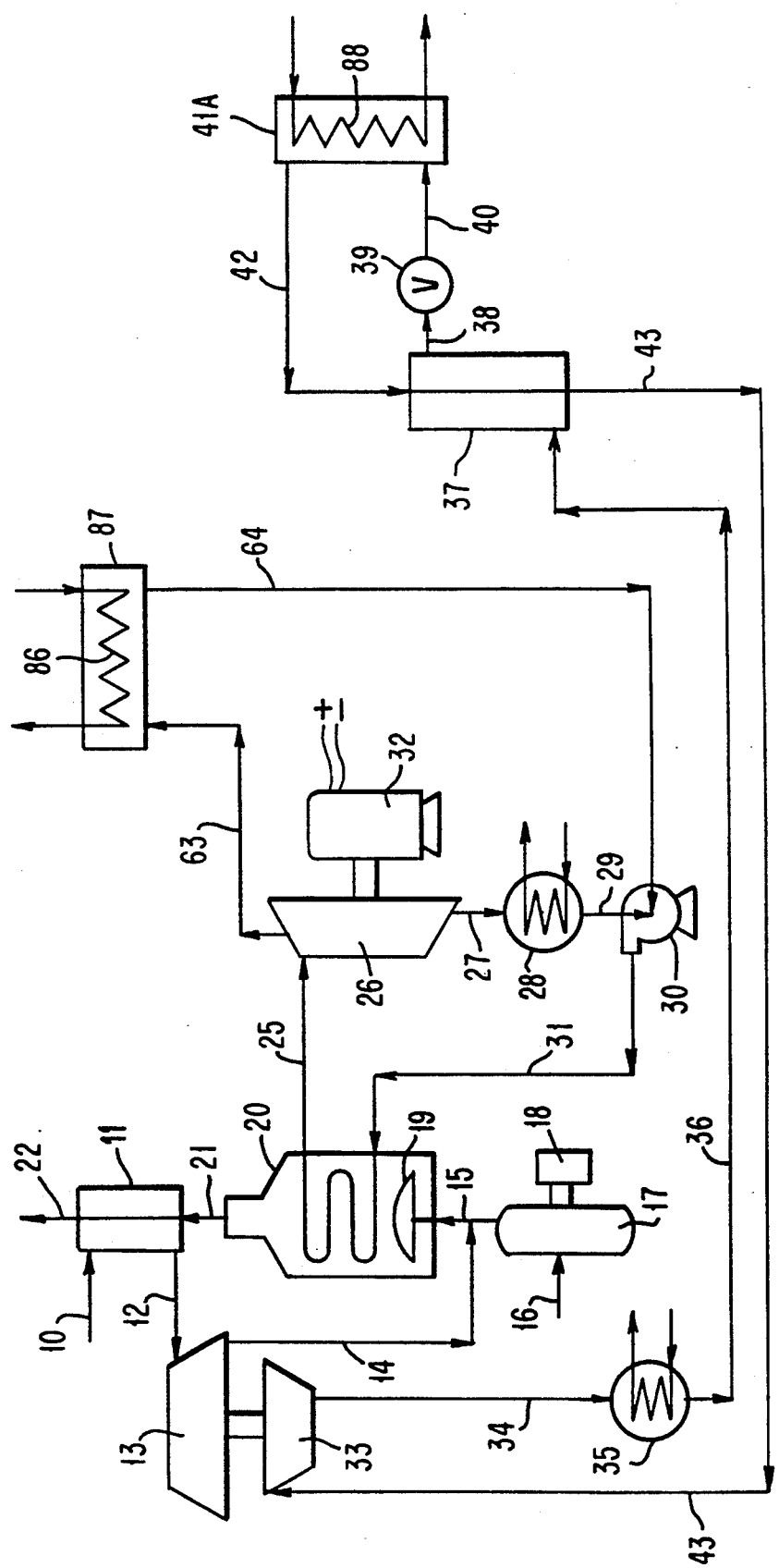
FIG. 2 is a flow diagram of the simplest embodiment of the invention.

The flow diagram of FIG. 2 shows the cogeneration system of the invention in its simplest form. All of the elements shown in FIG. 1 for the recovery of $CO_2$ have been eliminated in FIG. 2. Reference numerals in FIG. 2 are the same as those used in FIG. 1.

More specifically, flue gas leaving heat exchanger 11 through line 22 is vented to the atmosphere in FIG. 2. There is no need for reboiler heat and thus lines 63,64 can be eliminated. However, if the cogeneration system is part or neighbor of a manufacturing operation that requires processing heat, lines 63,64 can be used to provide such heat. If lines 63,64 are eliminated, the full expansion of all the steam supplied to turbine 26 by line 25 in the example of FIG. 1 will increase the power delivered by generator 32 to 31 MW. In FIG. 2, lines 63,64 are retained to illustrate the option of providing processing heat to a fluid passed through coil 86 in exchanger 87. Inasmuch as there is no $CO_2$ to be liquefied, evaporator 41A of FIG. 2 serves to deliver saleable refrigeration. Antifreeze or other suitable fluid is circulated through coil 88 in evaporator 41A to convey the refrigeration to an operation such as the commercial freezing of fish and meat.

A distinct advantage of the invention is its flexibility and versatility in being able to deliver two or more products, one of which is electricity. Moreover, the unique cogeneration process achieves two other important goals: high thermal efficiency and very low emission of atmospheric pollutants. Limiting the amount of combustion air to not more than about 25% in excess of the stoichiometric requirement, preferably not more than about 15% in excess, leads to high thermal efficiency. Such a limited amount of combustion air is made practical by the use of a porous fiber burner which permits surface flameless combustion of the fuel gas yielding a flue gas with a remarkably low content of pollutants which on a volume basis rarely exceed about 20 ppm $NO_x$, 50 ppm CO and 5 ppm unburned hydrcarbons. The suppression of CO emission is enhanced by a small amount of fine aluminum powder uniformly distributed in the porous fiber layer of the burner as taught by aforesaid U.S. Pat. No. 3,383,159.

The term amine used herein is a shortened word for a class of chemical absorbents known as alkanolamines. The two amines which have proved to be of principal commercial interest are monoethanolamine and diethanolamine. While the specific example of the invention is based on monoethanolamine, other amines are available for use in the invention. A fairly broad discussion, entitled Alkanolamines for Hydrogen Sulfide and Carbon Dioxide Removal, by Kohl and Riesenfeld in their textbook Gas Purification (pages 29–109, 4th Edition, 1985, Gulf Publishing Company), presents the technology of separating $CO_2$ from other gases and is made a part of this disclosure.

Variations and modifications of the invention will be apparent to those skilled in the art without departing from the spirit and scope of the invention. For example, if available natural gas or other fuel gas is below the pressure required to perform enough work in driving the refrigerant compressor to deliver the desired quantity of refrigeration, a booster-compressor may be added in line 10 to raise the gas to the required pressure. The electric power to operate the booster can easily be supplied by generator 32 without materially reducing the amount of net saleable electricity. Preheating the fuel gas in exchanger 11 serves two purposes: moisture in the gas will not freeze when expanded and turbo-expander 13 performs increased work. If the preheated gas in line 12 is not at a high enough temperature to prevent the freezing of moisture during passage of the gas through expander 13, a heater, preferably gasfired, may be inserted in line 12, to raise the preheat temperature sufficiently to prevent freezing in expander 13. Part of the energy consumed in the added heater is recovered as increased work performed by expander 13.

Other variations include means for cooling the flue gas in line 44 if it is desired to reduce the gas temperature before the flue gas enters absorption column 45. A water-cooled exchanger may be inserted in line 44 or water may be simply injected into line 44 to drop the gas temperature. If in the specific example of FIG. 1, a purchaser is not available for 15% of the $CO_2$ gas recovered by the amine absorption system, 15% of the flue gas passing through line 22 can be vented to the atmosphere via branch line 22A. In such case, the reduced amount of flue gas treated in the amine absorption system will reduce the power consumption of motor 24 and pumps 49,54,65 by about 1 MW so that the quantity of electricity sold can be increased from 21 to 22 MW.

Furthermore, a single steam turbine 26 with line 63 for drawing steam from an intermediate pressure stage of turbine 26 is shown in FIGS. 1 and 2; however, two steam turbines connected in tandem may replace turbine 26 and line 63 can in such case draw steam from the connection between the two turbines. Claim language such as: the steam turbine has a prt at an intermediate pressure stage, is intended as a simple expression for two steam turbines in tandem. Likewise, repeated mention of a porous fiber burner is clearly used as a simple expression for a multiplicity of such burners supplied in parallel with the mixture of fuel gas and combustion air. Accordingly, only such limitations should be imposed on the invention as are set forth in the appended claims.

What is claimed is:

1. A cogeneration system for the production of electricity and refrigeration with low $NO_x$ combustion of fuel gas supplied at a high pressure, which comprises:
   (1) a heat exchanger to heat said fuel gas at high pressure;
   (2) a turbo-expander connected to receive and expand the heated fuel gas from said heat exchanger (1);
   (3) a centrifugal compressor driven by said turbo-expander (2), said compressor being the refrigerant compressor of a refrigeration system;
   (4) a porous fiber burner connected to receive the expanded fuel gas from said turbo-expander (2) together with the requisite combustion air;
   (5) a high-pressure steam boiler heated by the combustion of said expanded fuel gas on the outer surface of said porous fiber burner (4), said boiler being connected to pass the resulting flue gas with low $NO_x$ content through said heat exchanger (1) to heat said fuel gas at high pressure;
   (6) a steam turbine connected to receive and expand high-pressure steam from said boiler (5) and to return expanded and condensed steam to said boiler (5); and
   (7) an electric generator driven by said steam turbine (6).

2. The cogeneration system of claim 1 wherein the steam turbine (6) has a port at an intermediate pressure stage for the withdrawal of steam to be utilized as processing heat.

3. The cogeneration system of claim 2 wherein an amine absorption system for the recovery of carbon dioxide is connected to the heat exchanger (1) to receive the flue gas leaving said heat exchanger (1), said absorption system having the reboiler of its stripping column connected so as to be heated by steam withdrawn through the port at an intermediate pressure stage of the steam turbine (6).

4. The cogeneration system of claim 3 wherein the porous fiber burner (4) contains a uniformly distributed, small amount of fine aluminum powder.

5. The cogeneration system of claim 3 wherein a compressor is connected to receive the carbon dioxide recovered by the amine absorption system and to pass the compressed carbon dioxide through a water-cooled exchanger to a water condensate separator, a dehydrator is connected for the flow of the carbon dioxide from said separator to a liquefier, said liquefier being connected to receive refrigeration produced by the centrifugal compressor (3), and a pressurized tank is connected to receive liquid carbon dioxide discharged from said liquifier.

6. The cogeneration system of claim 5 wherein the porous fiber burner (4) contains a uniformly distributed, small amount of fine aluminum powder.

7. A cogeneration process for producing electricity and refrigeration from methane-rich fuel gas supplied at high pressure of at least about 200 psia and burned to yield a flue gas of low $NO_x$ content, which comprises:
   heating said fuel gas supplied at high pressure by heat exchange with the hot flue gas specified hereinbelow,
   expanding the heated fuel gas with the performance of work while utilizing said work to compress the refrigerant vapor of a refrigeration system,
   effecting flameless combustion of the expanded fuel gas with an amount of air not more than about 25% in excess of the stoichiometric requirement on the outer surface of a porous fiber burner, thereby yielding hot flue gas of low $NO_x$ content not exceeding about 20 ppm,
   producing high-pressure steam with heat from said flameless combustion, and
   expanding said high-pressure steam with the performance of work while utilizing said work to drive an electric generator.

8. The cogeneration process of claim 7 wherein a portion of the high-pressure steam is only partially expanded with the performance of work and then utilized to provide processing heat.

9. The cogeneration process of claim 8 wherein the flue gas after heat exchange with the fuel gas is scrubbed with amine solution to absorb carbon dioxide in said flue gas, and the resulting carbon dioxide-laden amine solution is heated with the partially expanded steam to strip carbon dioxide therefrom.

10. The cogeneration process of claim 9 wherein the porous fiber burner contains a uniformly distributed, small amount of fine aluminum powder.

11. The cogeneration process of claim 9 wherein the carbon dioxide stripped from the amine solution is compressed, dehydrated, and finally liquefied with refrigeration supplied by the refrigeration system in which the refrigerant vapor is compressed with the work performed by expanding the heated fuel gas.

12. The cogeneration process of claim 11 wherein the porous fiber burner contains a uniformly distributed, small amount of fine aluminum powder.

* * * * *